(12) United States Patent
Kim

(10) Patent No.: US 10,961,041 B2
(45) Date of Patent: Mar. 30, 2021

(54) METHOD FOR PRODUCING PACKING SHEET WITH IMPROVED INSULATION AND STORAGE PROPERTIES

(71) Applicants: Ho Chil Kim, Iksan-si (KR); SEGYERO CO., LTD., Gimje-si (KR)

(72) Inventor: Ho Chil Kim, Iksan-si (KR)

(73) Assignees: SEGYERO CO., LTD., Gimje-si Jeollabuk-Do (KR); KIM, HOCHIL, Iksan-si (KR)

( * ) Notice: Subject to any disclaimer, the term of this patent is extended or adjusted under 35 U.S.C. 154(b) by 160 days.

(21) Appl. No.: 16/332,729

(22) PCT Filed: Aug. 30, 2017

(86) PCT No.: PCT/KR2017/009473
§ 371 (c)(1),
(2) Date: Mar. 12, 2019

(87) PCT Pub. No.: WO2018/052207
PCT Pub. Date: Mar. 22, 2018

(65) Prior Publication Data
US 2019/0225406 A1     Jul. 25, 2019

(30) Foreign Application Priority Data

Sep. 13, 2016  (KR) ........................ 10-2016-0117725

(51) Int. Cl.
*B65D 65/38*  (2006.01)
*B65D 81/38*  (2006.01)
(Continued)

(52) U.S. Cl.
CPC ......... *B65D 81/3888* (2013.01); *B65D 65/40* (2013.01); *B65D 81/03* (2013.01);
(Continued)

(58) Field of Classification Search
CPC .... B29C 66/439; B65D 81/03; B65D 81/052; B65D 81/3888
See application file for complete search history.

(56) References Cited

U.S. PATENT DOCUMENTS 5,849,394 A * 12/1998 Bussey, III ............... B32B 3/12
428/178
7,325,377 B2 * 2/2008 Fuss ................. B29C 66/00441
53/403

(Continued)

FOREIGN PATENT DOCUMENTS

DE     102014211663 A1 *  7/2015   ........... B65D 81/052
EP       2070838 A1 *  6/2009   ........... B65D 81/052
(Continued)

*Primary Examiner* — Andrew M Tecco
*Assistant Examiner* — Eyamindae C Jallow
(74) *Attorney, Agent, or Firm* — Novick, Kim & Lee, PLLC; Jae Yoon Kim

(57) ABSTRACT

Provided is a method for producing a packing sheet with improved insulation and storage properties, the method including: producing a cell packing sheet by attaching together two overlapping films such that multiple cells are formed therebetween, by sealing second ends of the cells, and by disposing a check valve in an injection hole formed in a first end of each of the cells; inflating the cells by injecting a fluid through the respective check valves of the cells; attaching upper and lower films respectively to upper and lower sides of the cell packing sheet; cutting the cell packing sheet along a second edge thereof together with the upper and lower films such that the second ends of the sealed cells are opened; and sealing a second end of the upper film, a second end of the cell packing sheet, and a second end of the lower film.

11 Claims, 18 Drawing Sheets

(51) Int. Cl.
  *B65D 65/40* (2006.01)
  *B65D 81/05* (2006.01)
  *B65D 81/03* (2006.01)
  *B29C 65/00* (2006.01)
  *B32B 1/00* (2006.01)

(52) U.S. Cl.
  CPC ............ *B65D 81/052* (2013.01); *B29C 65/00* (2013.01); *B32B 1/00* (2013.01)

(56) References Cited

U.S. PATENT DOCUMENTS

| | | | | |
|---|---|---|---|---|
| 7,959,759 | B2* | 6/2011 | Liao | B29C 66/3452 156/308.4 |
| 9,138,960 | B1* | 9/2015 | Liao | B65D 81/052 |
| 2003/0108699 | A1* | 6/2003 | Tanaka | B65D 81/052 428/35.2 |
| 2008/0250753 | A1* | 10/2008 | Sperry | B29C 65/226 53/79 |
| 2009/0287825 | A1* | 11/2009 | Walker | G06F 9/5072 709/226 |
| 2011/0127189 | A1* | 6/2011 | Liao | B65D 81/052 206/521 |
| 2011/0233101 | A1* | 9/2011 | Baines | B31D 5/0073 206/522 |
| 2015/0291335 | A1* | 10/2015 | Wetsch | B65D 81/052 428/12 |
| 2015/0291336 | A1* | 10/2015 | Wetsch | B32B 27/32 428/43 |
| 2016/0340103 | A1* | 11/2016 | Yoshifusa | B65D 81/057 |
| 2017/0266869 | A1* | 9/2017 | Schomer | B29C 66/81427 |
| 2017/0282479 | A1* | 10/2017 | Wetsch | B29C 66/225 |
| 2018/0297729 | A1* | 10/2018 | Liao | B65D 81/052 |
| 2019/0077567 | A1* | 3/2019 | Ye | B29C 66/439 |

FOREIGN PATENT DOCUMENTS

| | | | | |
|---|---|---|---|---|
| EP | 2554489 | A1 * | 2/2013 | ........... B65D 81/052 |
| JP | 2002-542125 | A | 12/2002 | |
| JP | 2003-175944 | A | 6/2003 | |
| JP | 2005-059559 | A | 3/2005 | |
| JP | 2006-526548 | A | 11/2006 | |
| JP | 2008-162266 | A | 7/2008 | |
| JP | 2012-162045 | A | 8/2012 | |
| JP | 2012-179875 | A | 9/2012 | |
| JP | 2013-124138 | A | 6/2013 | |
| JP | 2016-159959 | A | 9/2016 | |
| JP | 2016159959 | A * | 9/2016 | |
| KR | 10-2008-0063071 | A | 7/2008 | |
| KR | 10-0995179 | B1 | 11/2010 | |
| KR | 10-2011-0004091 | A | 1/2011 | |
| KR | 10-2013-0018355 | A | 2/2013 | |
| KR | 10-1351072 | B1 | 1/2014 | |
| KR | 10-1482311 | B1 | 1/2015 | |
| KR | 10-1500879 | B1 | 3/2015 | |
| WO | 2004/048077 | A1 | 6/2004 | |
| WO | WO-2007047767 | A3 * | 11/2007 | ........... B65D 77/225 |
| WO | WO-2009142372 | A1 * | 11/2009 | ........... B65D 81/052 |
| WO | WO-2010024498 | A1 * | 3/2010 | ............. B65D 81/03 |
| WO | WO-2010024499 | A1 * | 3/2010 | ............. B65D 81/03 |
| WO | WO-2015012558 | A1 * | 1/2015 | ............. B65D 81/03 |

* cited by examiner

METHOD FOR PRODUCING PACKING SHEET WITH IMPROVED INSULATION AND STORAGE PROPERTIES

TECHNICAL FIELD

The present invention relates generally to a packing sheet and, more particularly, to a method for producing a packing sheet with greatly improved insulation and storage properties.

BACKGROUND ART

In general, packing materials are used not only to enhance the appearance of packed goods, but also to protect the packed goods against external impacts. In particular, in packing of electrical and electronic products or automobile parts such as, bumpers, fenders, doors, and the like, a first foaming paper sheet or an air cap wrapping sheet is generally used to separate the electrical and electronic parts and the automobile parts from an inner surface of a box wall inside of a paper box such that an impact force which may be externally applied to packed goods is absorbed and alleviated.

In the case of the air cap wrapping sheet, there is a problem in that the volume of air caps is inevitably large due to the air caps sealed in units of cells, causing an excessive increase in logistics costs such as transportation costs.

Meanwhile, in an effort to solve such a problem of the air cap wrapping sheet in the related art, Patent Documents 1 to 3 and the like have been proposed.

Patent Document 1 (Korean Patent No. 10-1482311) relates to a packing bag with a cushioning function, which includes a first cushioning air column part composed of multiple air columns, a second cushioning air column part composed of multiple air columns and connected to the first cushioning air column part to form an accommodation space for accommodating goods, and a tie connected to the first cushioning air column part and/or connected to the second cushioning air column part to close an entrance of the accommodation space.

Furthermore, Patent Document 2 (Korean Patent No. 10-1351072) relates to a package equipped with a double air bag and a packaging method thereof, the package including an inner cushioning part composed of a pair of backing sheets coupled to each other, the inner cushioning part in which air is filled and forming an accommodating portion for accommodating a packaging object; an outer cushioning part surrounding the inner cushioning part and in which air is filled; and an air injection part to which air is injected through an air inlet, wherein the air injection part is configured to communicate with the inner and outer cushioning parts via both an air filling inlet of the inner cushioning part and an air filling inlet of the outer cushioning part, whereby air filling of the inner and outer cushioning parts is completed by only one air injection through the air injection part.

Patent Document 3 (Korean Patent No. 10-0995179) relates to a bendable multi-sectional cushioning cover bag including a packaging box, a first air tube, a second air tube, and a light-reflecting sheet. Herein, an end of the second air tube is connected to the first air tube and communicates therewith. Furthermore, multiple first cushioning parts provided at the first air tube and multiple second cushioning parts provided at the second air tube correspond to each other, and each of the second cushioning parts and each of the first cushioning parts corresponding thereto are adhered together by means of heat sealing at respective three sides thereof, thus forming an accommodation space in which goods are mounted.

The packing bag, the package, and the cover bag disclosed in Patent Documents 1 to 3 can be transported and stored and in a state of not injecting air and thus are significantly reduced in volume as compared with the air cap packing sheet in the related art, resulting in a significant reduction in logistics costs such as transportation costs. In addition, air can be injected before use to realize a cushioning function, thus safely packing goods. Meanwhile, a predetermined insulation property is provided by air cells into which air is injected. However, the air cells are welded together, which may cause a problem in that heat exchange is increased by welded portions, resulting in a significant reduction in insulation.

DISCLOSURE

Technical Problem

Accordingly, the present invention has been made keeping in mind the above problems occurring in the related art, and an objective of the present invention is to provide a packing sheet capable of greatly reducing logistics costs by minimizing a volume during storage and transportation, while greatly increasing insulation.

Technical Solution

In order to accomplish the above objective, the present invention provides a

A method for producing a packing sheet with improved insulation and storage properties, the method including: producing a cell packing sheet by attaching together two vertically overlapping films such that multiple cells are formed therebetween, by sealing second ends of the multiple cells, and by disposing a check valve in an injection hole formed in a first end of each of the multiple cells;

inflating the multiple cells by injecting a fluid through the respective check valves of the cells of the cell packing sheet;

attaching an upper film and a lower film respectively to an upper side and a lower side of the cell packing sheet in which the multiple cells have been inflated;

cutting the cell packing sheet along a second edge thereof together with the upper and lower films such that the second ends of the sealed multiple cells of the cell packing sheet are opened; and sealing second ends of the lower film, the cell packing sheet, and the lower film after a fluid in the sealed ridges of the cell packing sheet is removed.

In particular, a first end of the upper film and a first end of the lower film may be extended longer than a first end of the cell packing sheet in a first side direction, and a common check valve may be provided on an upper surface of the first end of the lower film. Furthermore, the common check valve may comprise multiple common check valves that are provided at a regular interval on the upper surface of the first end of the lower film.

The method may further include forming a common injection space that is in communication with the check valves by sealing the first end of the lower film and the first end of the upper film, except for an injection hole of the common check valve.

Furthermore, lower films, upper films, and cell packing sheets may be attached together in a state in which the lower films and the upper films are alternately stacked on top of each other with the cell packing sheets each interposed between the lower films and the upper films, and the common check valve may be provided on the upper surface of the first end of each of the lower films and on an upper surface of the first end of each of the upper films.

Furthermore, gas may be filled in the cells.

Herein, the gas may be air or an inert gas.

Alternatively, a liquid may be filled in the cells.

Herein, the liquid may be water.

Furthermore, a light reflection layer may be provided on an upper side of the upper film or on a lower side of the lower film, or the light reflection layer may be provided both on the upper side of the upper film and on the lower side of the lower film.

Alternatively, a cover layer may be provided on an upper side of the upper film or on a lower side of the lower film, or the light reflection layer may be provided both on the upper side of the upper film and on the lower side of the lower film.

Advantageous Effects

As described above, the present invention can greatly reduce logistics costs by minimizing a volume during storage and transportation, while greatly increasing insulation.

BEST MODE

Hereinafter, exemplary embodiments of the present invention will be described in further detail with reference to the accompanying drawings. It will be understood by those of ordinary skill in the art that various changes and modifications may be made therein without departing from the technical idea and scope of the present invention and such changes and modifications belong to the claims of the present invention.

Figure 1:
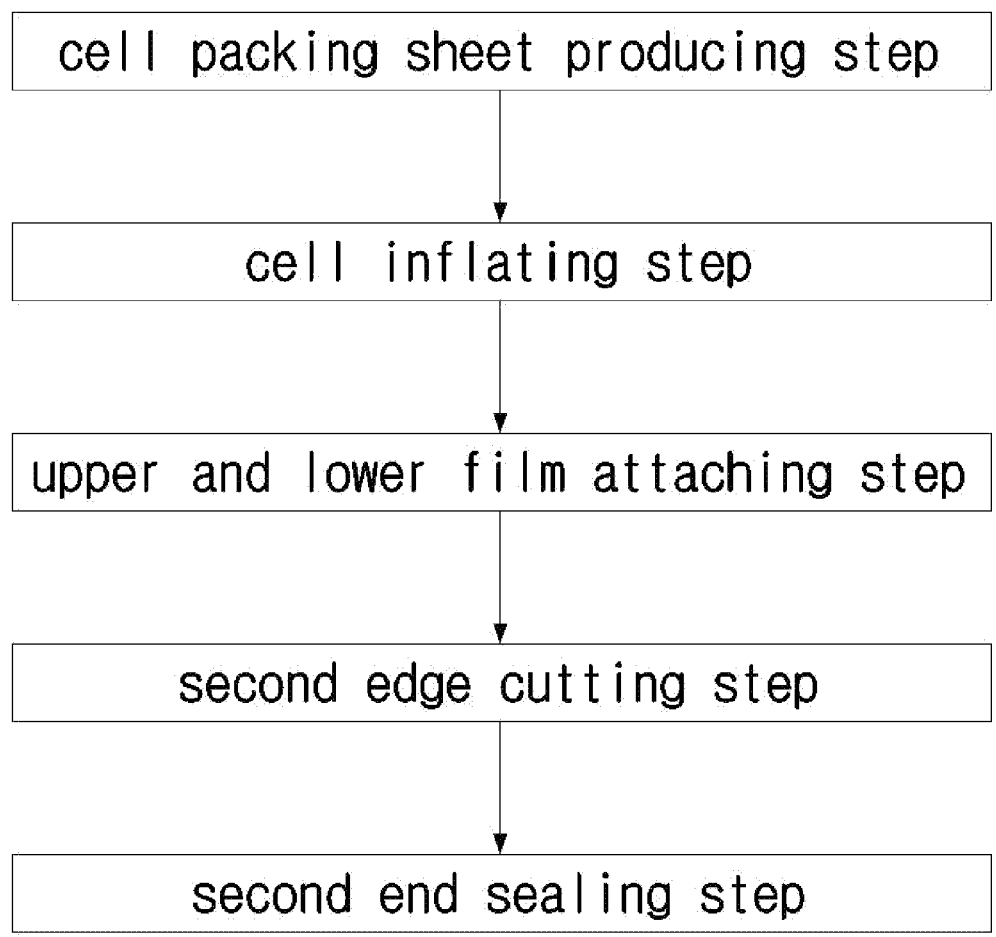
FIG. 1 is a flowchart schematically showing a method for producing a packing sheet with improved insulation and storage properties according to a first embodiment of the present invention.

FIG. 1 is a flowchart schematically showing a method for producing a packing sheet with improved insulation and storage properties according to a first embodiment of the present invention.

As shown in FIG. 1, the method for producing the packing sheet with improved insulation and storage properties largely includes a) a cell packing sheet producing step (hereinafter referred to as 'step a)'), b) a cell inflating step (hereinafter referred to as 'step b)'), c) an upper and lower film attaching step (hereinafter referred to as 'step c)'), d) a second edge cutting step (hereinafter referred to as 'step d)'), and e) a second end sealing step (hereinafter referred to as ' step e)').

Figure 2:
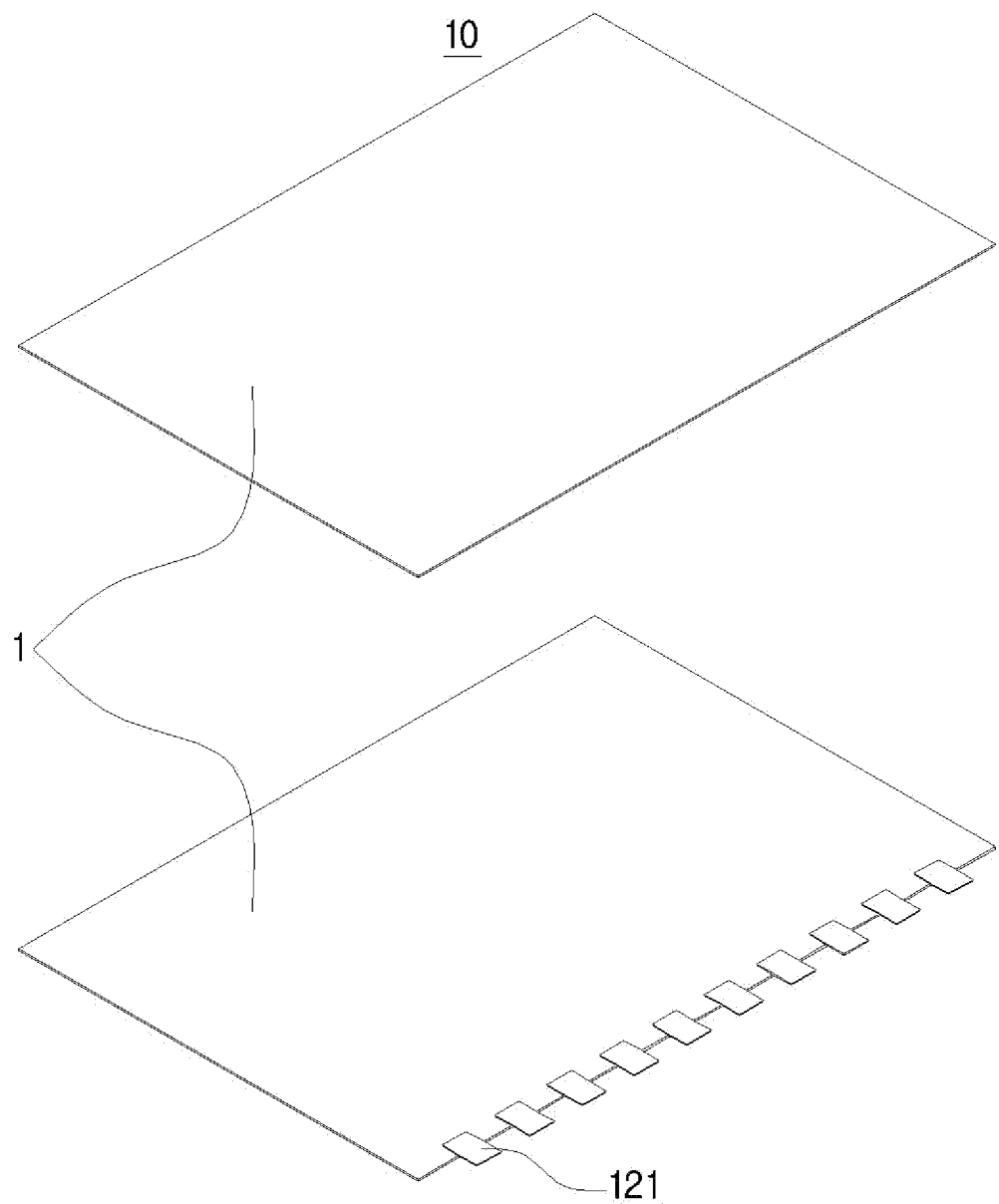
FIGS. 2 to 4 are perspective views schematically showing a process of producing a cell packing sheet.
Figure 3:
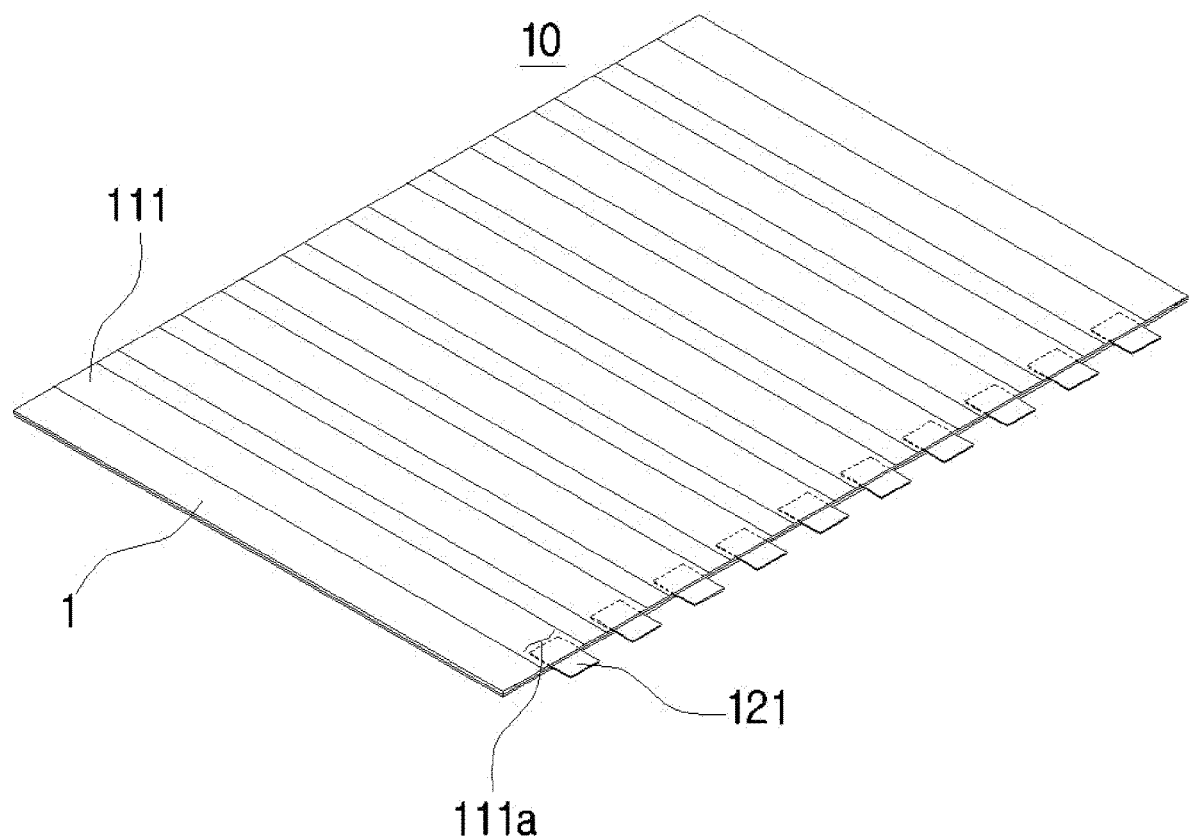
Figure 4:
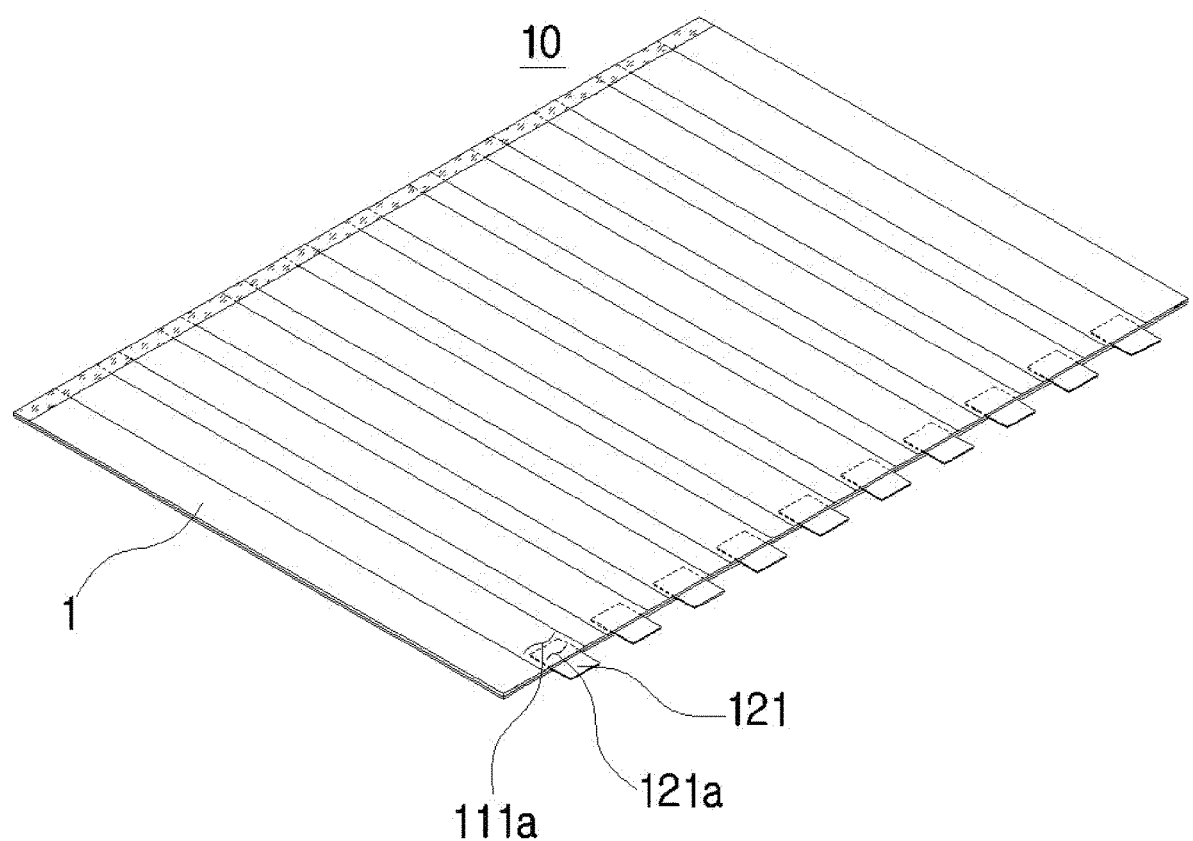

FIGS. 2 to 4 are perspective views schematically showing a process of producing a cell packing sheet.

First, the step a) is a step of producing the cell packing sheet 10 on which multiple cells 111 are provided.

As shown in FIGS. 2 and 3, two vertically overlapping films 1 are welded together such that the multiple cells 111 each being open at first and second sides thereof are formed between the two films 1 at a regular interval in a direction from a front side of the two films 1 to a rear side thereof.

Furthermore, in order to close second ends of the multiple cells 111 opposite to first ends thereof, the second ends of the multiple cells 111 are sealed by various methods such as adhering, welding, or the like.

In this state, as shown in FIG. 4, a check valve 121 is disposed in an injection hole 111a formed in a first end of each of the multiple cells 111. Thereafter, the first ends of the multiple cells 111 are sealed by various methods such as adhering, welding, or the like, except for an injection hole 121a of the respective check valves 121 of the cells.

Figure 5:
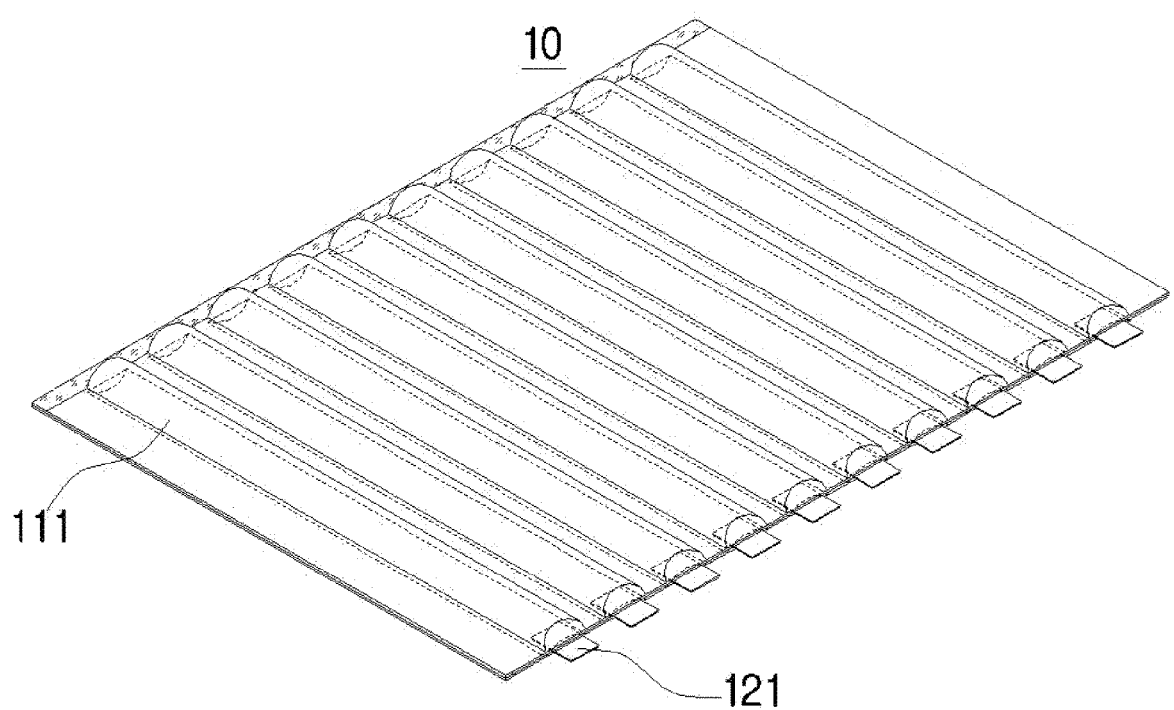
FIG. 5 is a perspective view schematically showing a state in which multiple cells of the cell packing sheet are inflated.

FIG. 5 is a perspective view schematically showing a state in which the multiple cells of the cell packing sheet are inflated.

Next, as shown in FIG. 5, the step b) is a step of inflating the multiple cells 111 by injecting a fluid such as air into the multiple cells 111 through the check valves 121 of the cell packing sheet 10 by using an injection means such as an injector.

Figure 6:
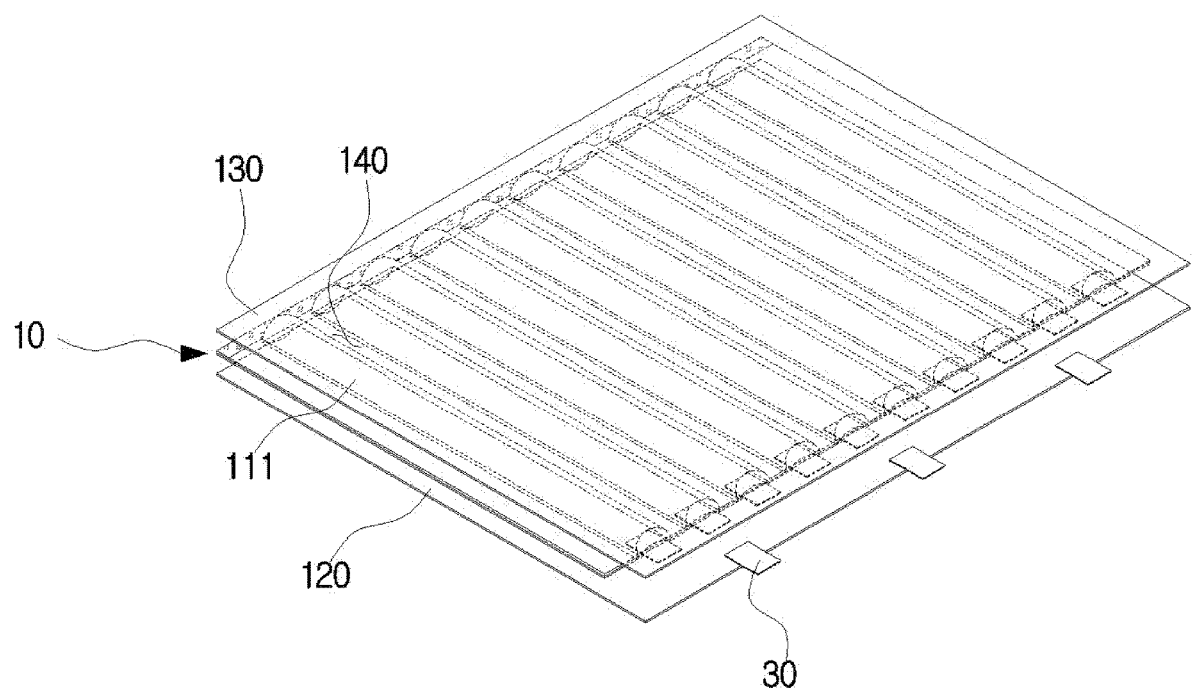
FIG. 6 is a perspective view schematically showing a state in which an upper film and a lower film are attached to an upper side and a lower side of the cell packing sheet, respectively.

FIG. 6 is a perspective view schematically showing a state in which an upper film and a lower film are attached to an upper side and a lower side of the cell packing sheet, respectively.

Next, as shown in FIG. 6, the step c) is a step of attaching the upper and lower films 130 and 120 to the upper and lower sides of the cell packing sheet 10, respectively by various methods such as bonding after the multiple cells 111 are inflated.

In particular, since the cells 111 are in an inflated state, it is possible to easily join the upper and lower films 130 and 120 to the upper and lower sides of the multiple cells 111 of the cell packing sheet 10, respectively.

Next, as shown in FIG. 6, a first end of the upper film 130 is extended longer than the a first end of the cell packing sheet 10 in a first side direction of the upper film 130 such that the upper film 130 is longer in horizontal length than the cell packing sheet 10.

Furthermore, a first end of the lower film 120 is extended longer than the first end of the cell packing sheet 10 in a first side direction the lower film 120 such that the lower film 120 is longer in horizontal length than the cell packing sheet 10.

Furthermore, as shown in FIG. 6, a common check valve 30 is provided on an upper surface of the first end of the lower film 120 or on a lower surface of the first end of the upper film 130.

One common check valve 30 may be provided on the upper surface of the first end of the lower film 120 or on the lower surface of the first end of the upper film 130. However, in order to allow air to be injected again into the multiple cells 111 of the cell packing sheet 10 and a space 140 (see FIG. 6) formed between each of the multiple cells 111, as shown in FIG. 6, it is preferable that at least two multiple common check valves 30 are provided at a regular interval on the upper surface of the first end of the lower film 120 or on the lower surface of the first end of the upper film 130.

Figure 7:
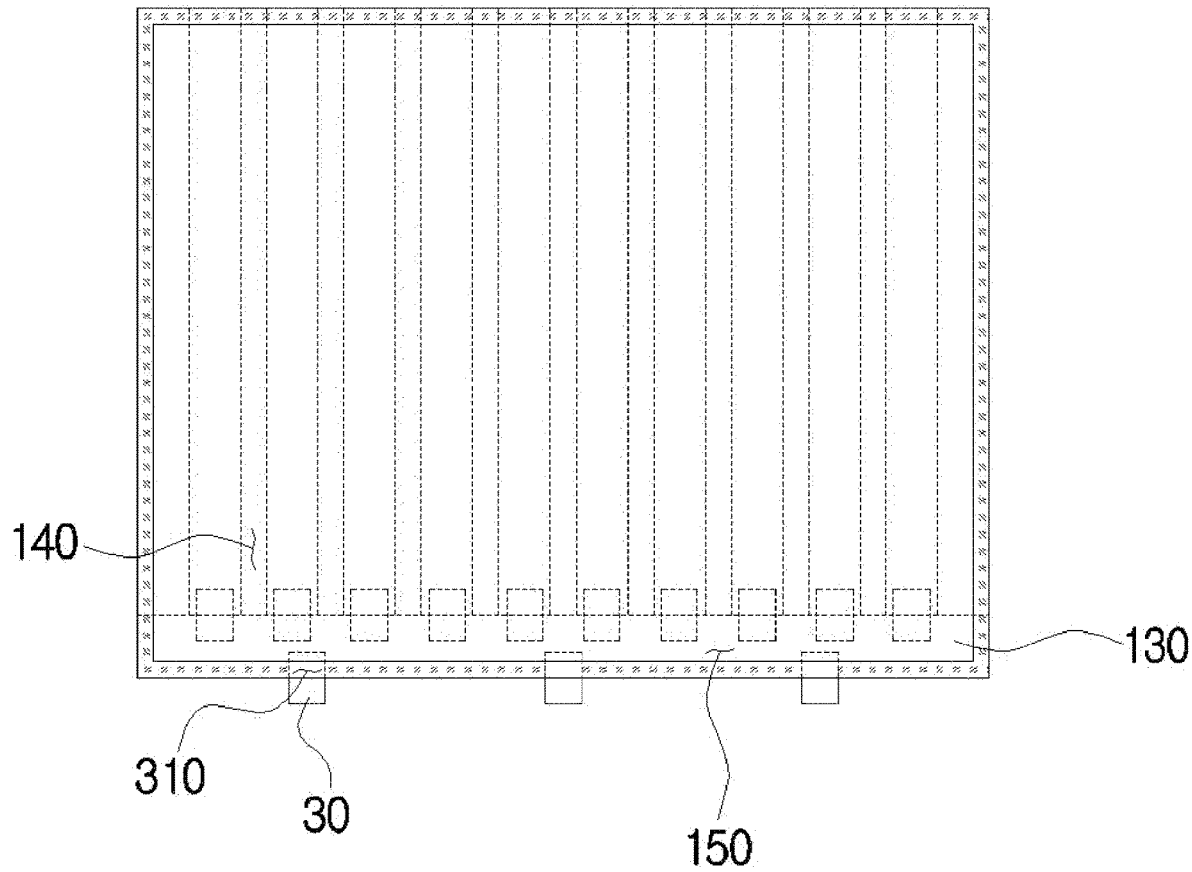
FIG. 7 is a plan view schematically showing a state in which ends of the cell packing sheet, the upper film, and the lower film are sealed.

FIG. 7 is a plan view schematically showing a state in which ends of the cell packing sheet, the upper film, and the lower film are sealed.

Next, as shown in FIG. 7, there is further included a common injection space forming step (hereinafter, referred to as 'step $c_1$)') of forming an common injection space 150 that is in communication with the check valves 121 by sealing the first end of the lower film 120 and the first end of the upper film 130 by various methods such as adhering, welding, or the like, except for an injection hole 310 of each of the common check valves 30.

Furthermore, front and rear ends of the cell packing sheet 10, front and rear ends of the lower film 120, and front and rear ends of the upper film 130 are sealed by various methods such as adhering, welding, or the like.

The fluid such as air is injected into the common injection space 150 through the injection holes 310 of the common check valves 30 by using an injection means such as an injector. The fluid such as air injected into the common injection space 150 in the step $c_1$) is injected into the multiple cells 111 and into the spaces 140 formed between the multiple cells 111.

When the fluid such as air is injected into the multiple cells 111 through the multiple common check valves 30, adjacent ones of the cells 111 are closed in a state in which the upper film 130 and the lower film 120 are attached. This makes it possible to greatly increase cushioning and insulation of the cell packing sheet 10.

In particular, because the fluid such as air is injected into the spaces 140 formed between the cells 111, heat exchange due to the spaces 140 is prevented, thus preventing insulation of the cell packing sheet 10 from being deteriorated with high efficiency.

Figure 8:
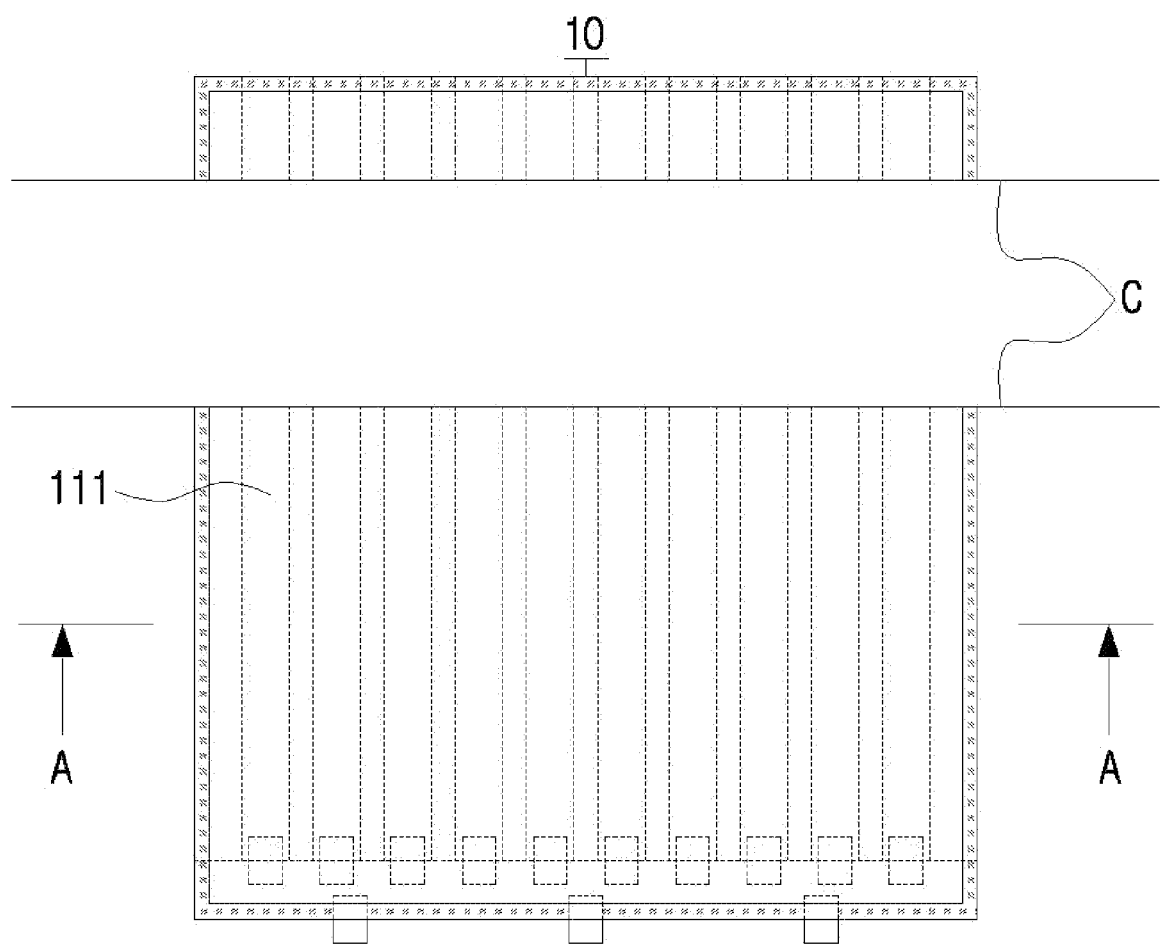
FIG. 8 is a plan view schematically showing a state in which the cell packing sheet is cut along a second edge thereof together with the upper film and the lower film in order to remove air in the multiple cells.

FIG. 8 is a plan view schematically showing a state in which the cell packing sheet is cut along a second edge thereof together with the upper film and the lower film in order to remove air in the multiple cells.

Next, the step d) is a step of cutting (refer to C in FIG. 8) the cell packing sheet 10 along the second edge thereof by using a cutting tool such as a cutter knife as shown in FIG. 8, such that the second ends of the sealed multiple cells 111 of the cell packing sheet 10 are opened. This is to remove the fluid such as air in the multiple cells 111 to outside of the multiple cells 111.

Figure 9:
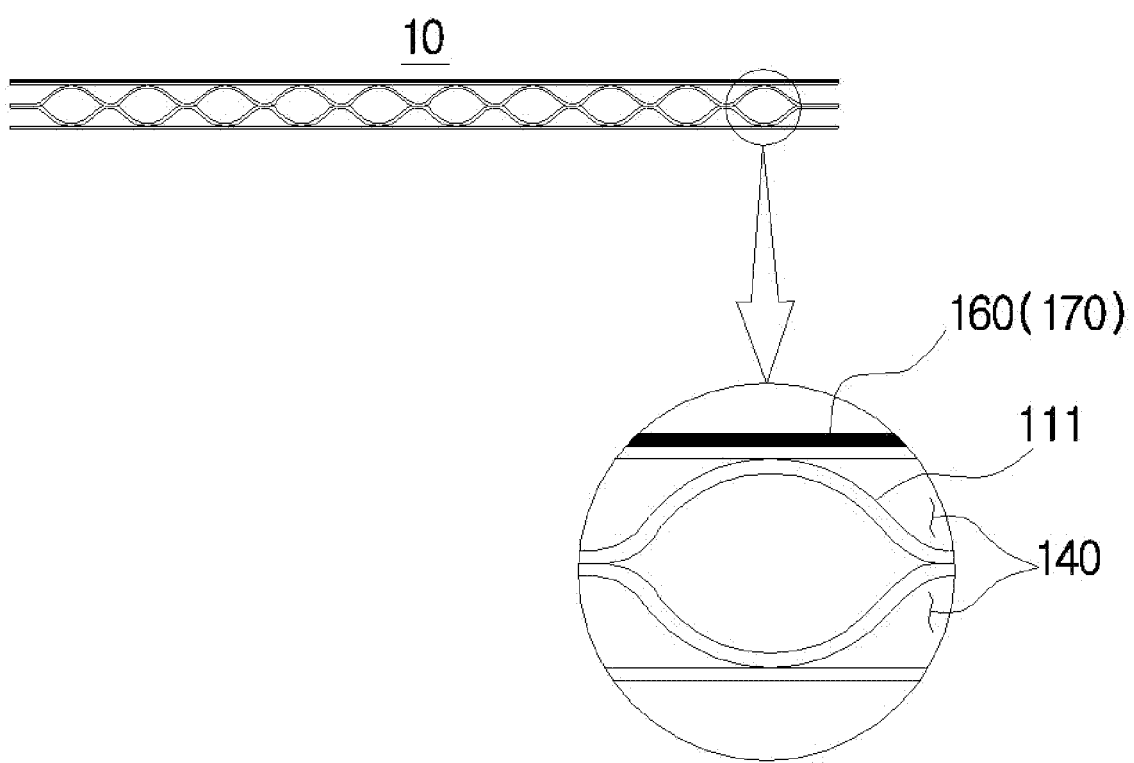
FIG. 9 is a cross-sectional view taken along line A-A of FIG. 8.
Figure 10:
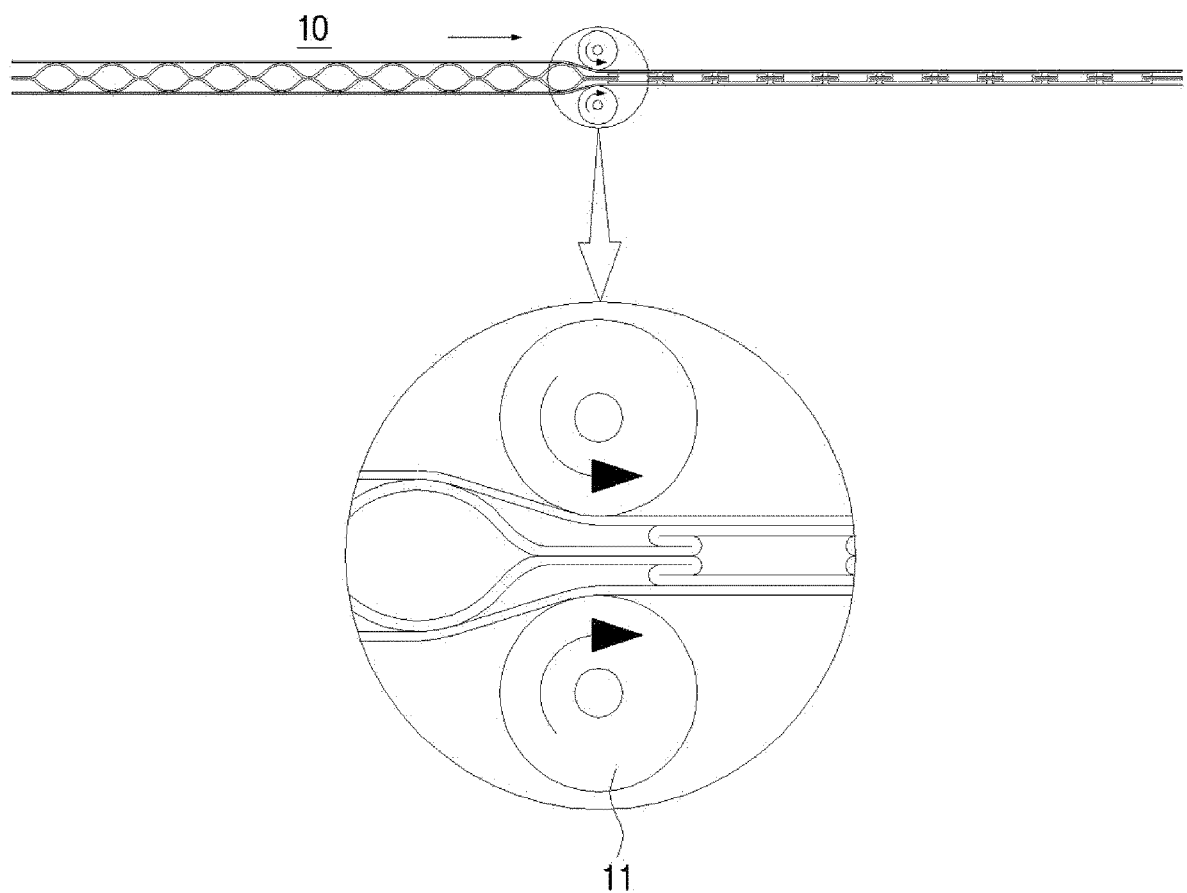
FIG. 10 is a cross-sectional view schematically showing a process of compressing the cell packing sheet.

FIG. 9 is a cross-sectional view taken along line A-A of FIG. 8, and FIG. 10 is a cross-sectional view schematically showing a process of compressing the cell packing sheet.

As shown in FIGS. 9 and 10, for example, when the cell packing sheet 10 which has been cut along the second edge thereof is passed between a pair of rotary rollers 11, the fluid such as air in the multiple cells 111 of the cell packing sheet 10 is removed to outside of a second end of the cell packing sheet 10 while the cell packing sheet 10 is compressed.

Figure 11:
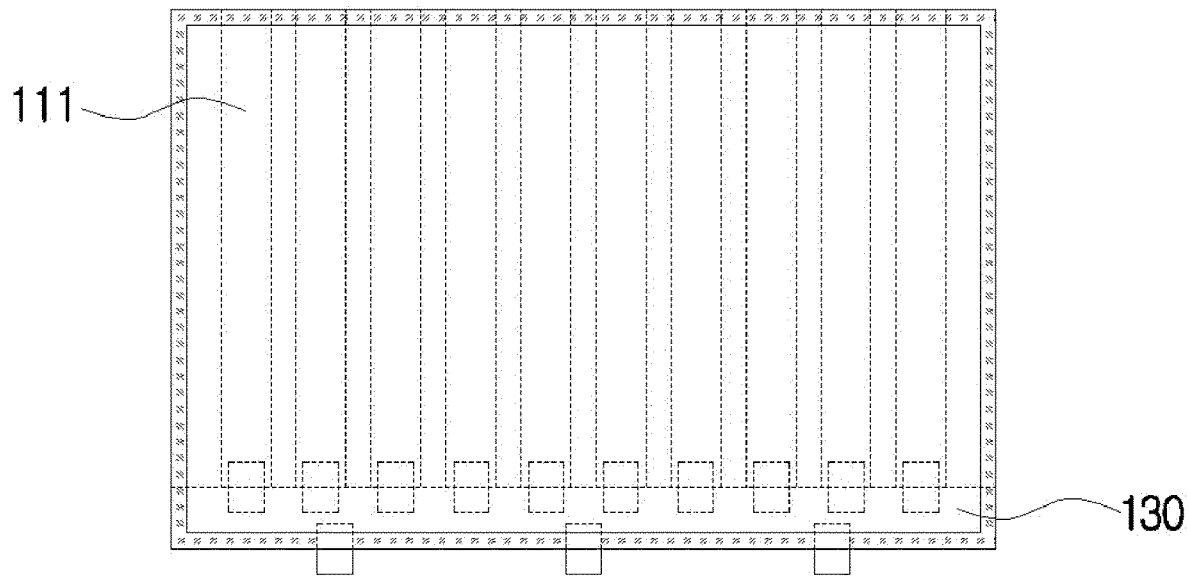
FIG. 11 is a plan view schematically showing a state in which second ends of the upper film, the cell packing sheet, and the lower film are sealed after compression.

FIG. 11 is a plan view schematically showing a state in which second ends of the upper film, the cell packing sheet, and the lower film are sealed after compression.

Next, as shown in FIG. 11, the step e) is a step of sealing the second ends of the upper film 130, the cell packing sheet 10, and the lower film 120 by various methods such as adhering, welding, or the like after the fluid such as air in the multiple cells 111 of the cell packing sheet 10 is removed.

Figure 12:
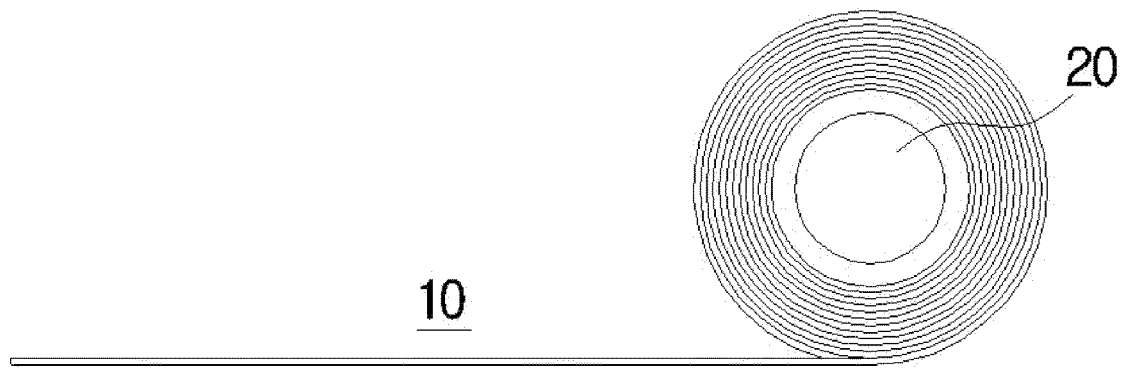
FIG. 12 is a side view schematically showing a state in which the lower film, the cell packing sheet, and the upper film are wound on a winding roller after compression.

FIG. 12 is a side view schematically showing a state in which the lower film, the cell packing sheet, and the upper film are wound on a winding roller after compression.

Next, there is further included a winding step (hereinafter referred to as 'step f)') of winding on an outer surface of the winding roller 20 in a roll type the cell packing sheet 10 in which the second end thereof is not sealed or the cell packing sheet 10 in which the second end thereof is sealed.

Through the step f), air in the cells 111 is removed. This makes it possible for the cell packing sheet 10 to be transported and stored in a state in which the volume of the cell packing sheet 10 is minimized, resulting in a significant reduction in logistics costs.

Figure 13:
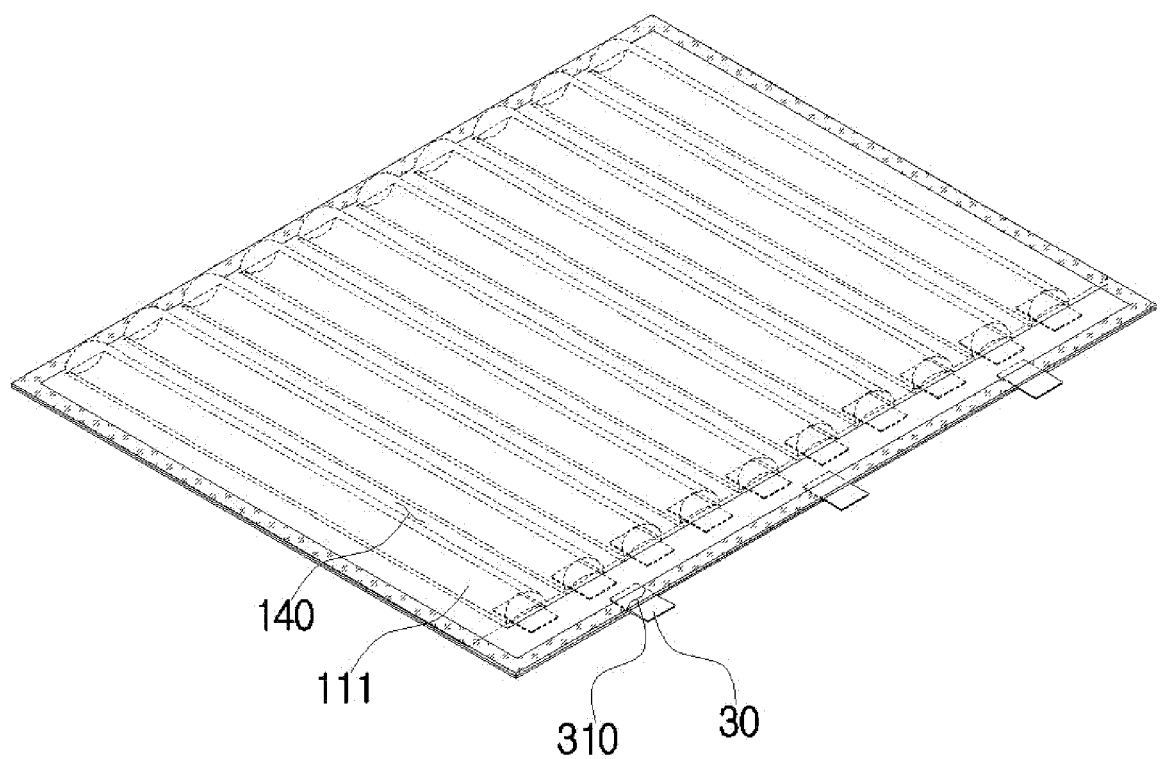
FIG. 13 is a perspective view schematically showing a state in which air is injected again into the multiple cells of the cell packing sheet and the multiple cells are inflated.

FIG. 13 is a perspective view schematically showing a state in which air is injected again into the multiple cells of the cell packing sheet and the multiple cells are inflated.

Next, the fluid such as air is injected into the common injection space 150 through the injection holes 310 of the common check valves 30 by using an air injection means such as an air injector. As shown in FIG. 13, the fluid such as air injected into the cells 111 are injected again into the cells 111 and into the spaces 140 formed between the cells 111.

Figure 14:
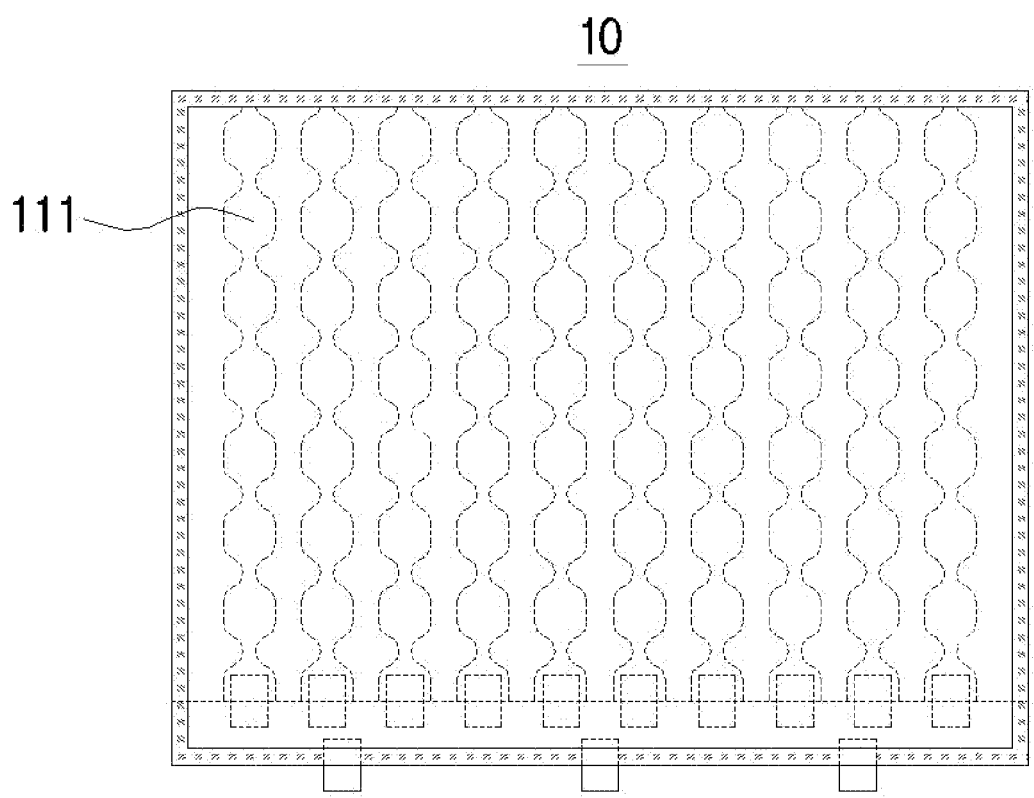
FIGS. 14 and 15 are plan views schematically showing another shape of the multiple cells of the cell packing sheet.
Figure 15:
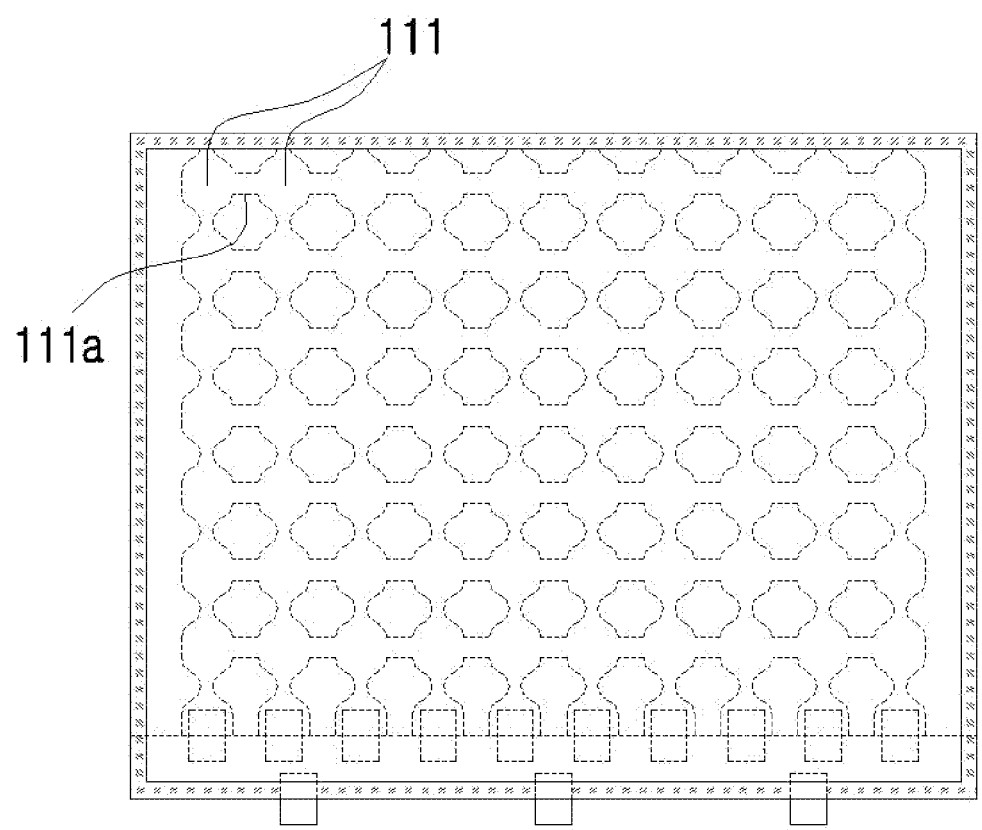

FIGS. 14 and 15 are plan views schematically showing another shape of the multiple cells of the cell packing sheet.

Next, as shown in FIG. 13, the cells 111 of the cell packing sheet 10 have a "-" shape horizontally extending in a direction from a first side of the cell packing sheet toward a second side thereof by a predetermined length, but the present invention is not limited thereto. The cells may have various shapes, for example, as shown in FIG. 14, multiple cells are arranged in an hourglass shape so as to communicate with each other in multiple rows.

Furthermore, as shown in FIG. 15, a connecting cell 111*a* is provided between a cell 111 of one-row and a cell 111 of an adjacent row and connects the cell 111 of the one row and the cell 111 of the adjacent row to each other, such that the connecting cell communicates with the cell 111 of the one row and the cell 111 of the adjacent row.

As describe above, the connecting cell 111*a* is provided between the cell 111 of the one row and the cell 111 of the adjacent row. However, in this case, when any one of the cells 111 is damaged, a fluid in all the other cells 111 as well as in the any one of the cells 111 is liable to leak out of the cell packing sheet 10. Accordingly, it is preferable that the connecting cell 111*a* is not provided.

Figure 16:
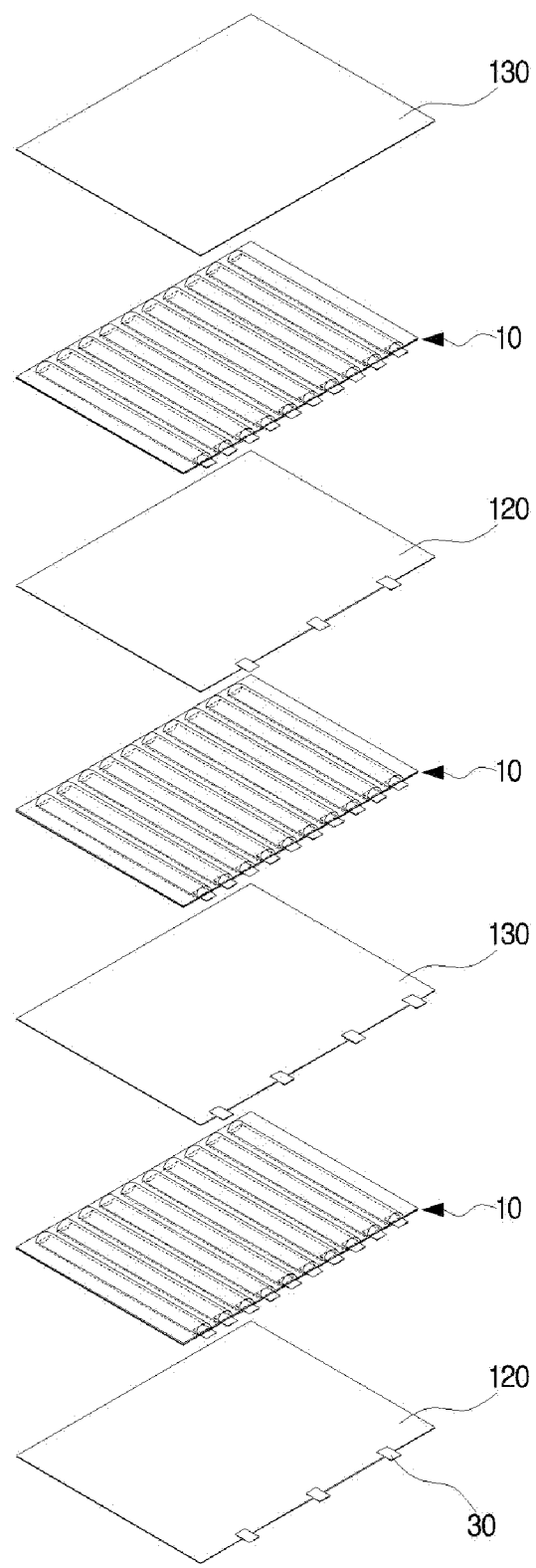
FIG. 16 is an exploded perspective view schematically showing multiple lower films, multiple cell packing sheets, and multiple upper films according to a second embodiment of the present invention.
Figure 17:
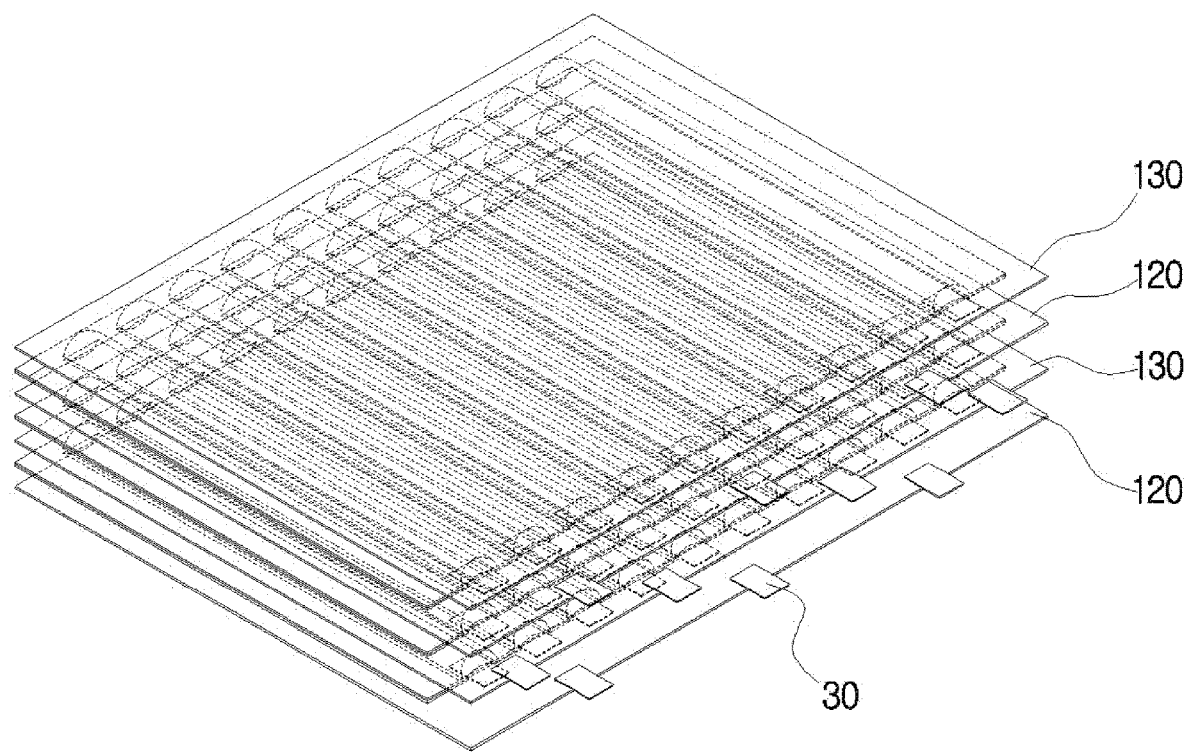
FIG. 17 is an assembled perspective view of FIG. 16.
Figure 18:
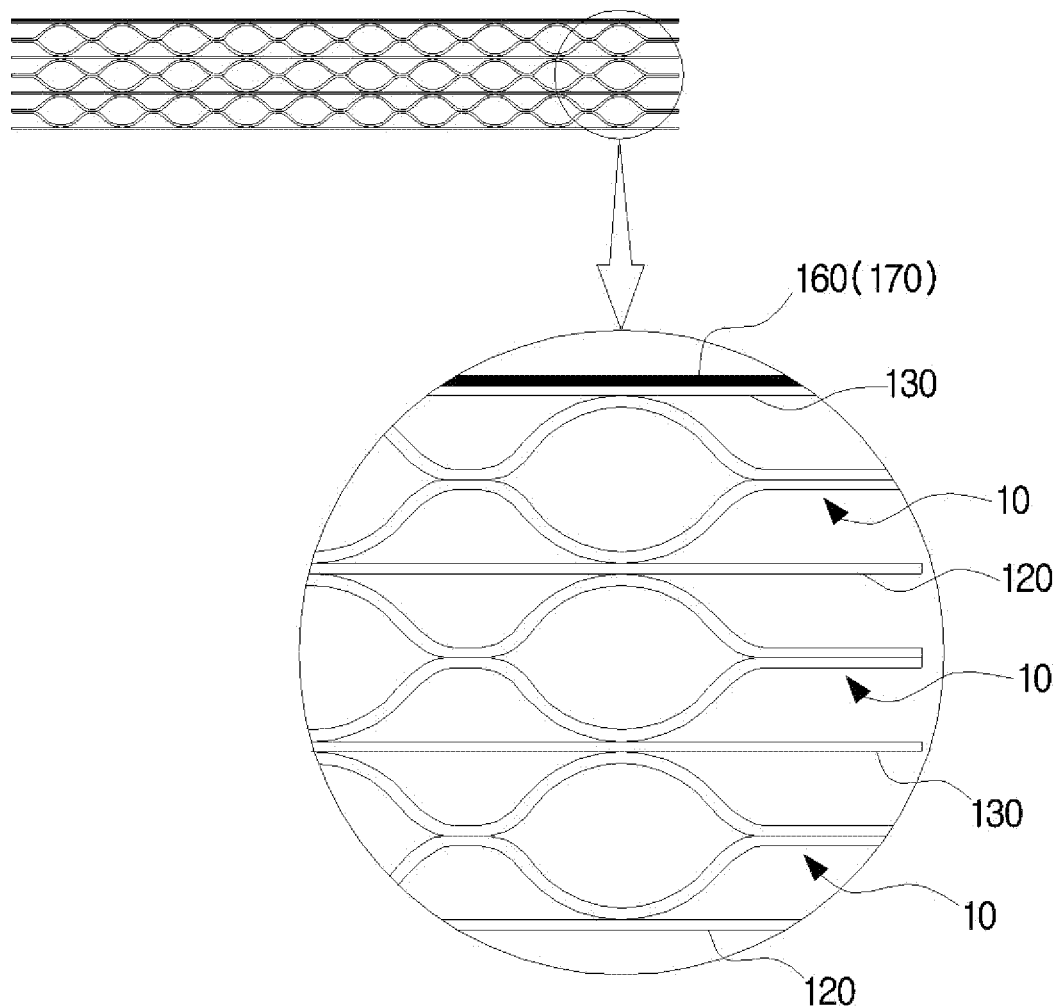
FIG. 18 is an assembled cross-sectional view of FIG. 16.
Figure 19:
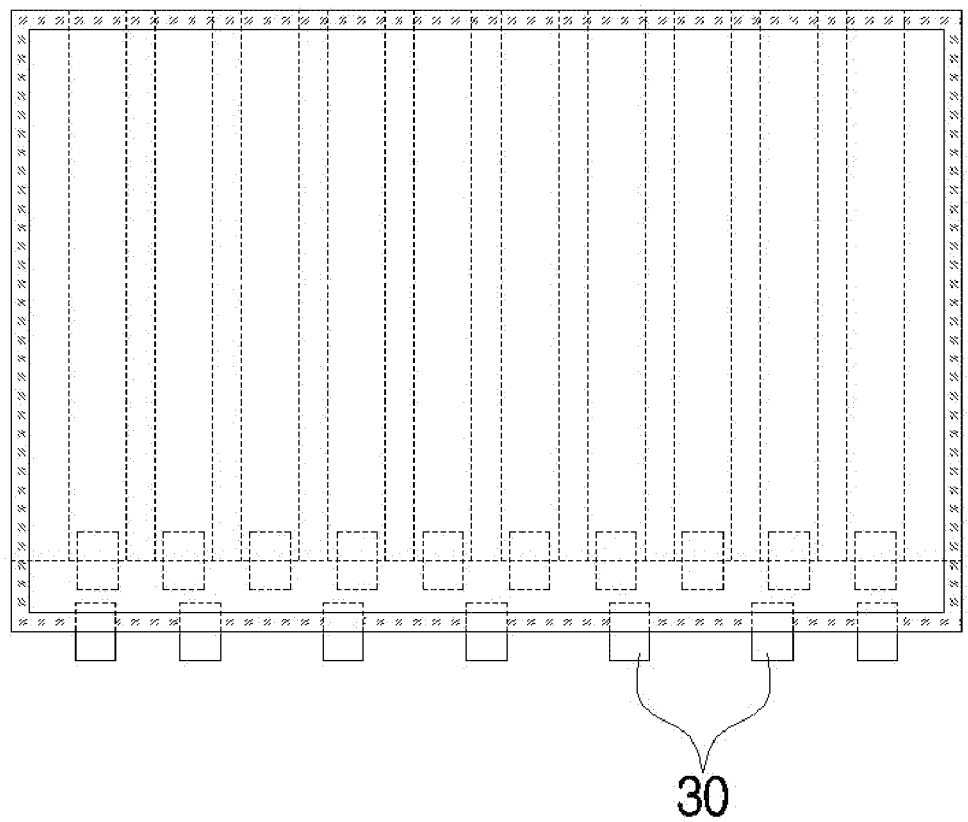
FIG. 19 is an assembled plan view of FIG. 16.

FIG. 16 is an exploded perspective view schematically showing multiple lower films, multiple cell packing sheets, and multiple upper films according to a second embodiment of the present invention, FIG. 17 is an assembled perspective view of FIG. 16, FIG. 18 is an assembled cross-sectional view of FIG. 16, and FIG. 19 is an assembled plan view of FIG. 16.

Next, a method for producing a packing sheet with improved insulation and storage properties according to a second embodiment of the present invention is configured in the same manner as that of the first embodiment except that as shown in FIGS. 16 to 19, the lower films 120, the upper films 130, and the cell packing sheets 10 are attached together in a state in which the lower films 120 and the upper films 130 are alternately stacked on top of each other with the cell packing sheets each interposed between the lower films and the upper films.

Furthermore, the common check valves 30 are provided on the upper surface of the first end of each of the lower films 120 and on an upper surface of the first end of each of the upper films 130.

Next, gas such as air is filled in all of the cells 111 of the cell packing sheets 10 as described above, but the present invention is not limited thereto. Various gases may be filled in the cells 111, such as an inert gas including nitrogen, argon, krypton, helium, neon, xenon, radon, and the like, which are not only excellent in insulation and but also stable and do not easily react.

Alternatively, various liquids such as water may be filled in all of the cells 111 of the cell packing sheets 10.

Alternatively, in the second embodiment, air is injected into all of the cells 111 of any one of the cell packing sheets 10, while the inert gas is filled in all of the cells 111 of another one of cell packing sheets 10, such that different gases are alternately filled in the cells 111 of the cell packing sheets 10, the cell packing sheets 10 being arranged sequentially from the top to the bottom.

Next, as shown in FIG. 9, a light reflection layer 160 is provided on an upper side of one upper film 130 of the first embodiment or on a lower side of one lower film 120 of the first embodiment. Alternatively, the light reflection layer 160 is provided both on the upper side of the one upper film 130 of the first embodiment and on the lower side of the one lower film 120 of the first embodiment. The light reflection layer is provided by various methods such as such as adhering, welding, or the like.

Furthermore, as shown in FIG. 18, the light reflection layer 160 is provided on the upper side of the upper film 130 located at the uppermost side of the cell packing sheets 10 of the second embodiment or on the lower side of the lower film 120 located at the lowermost side of the cell packing sheets 10 of the second embodiment. Alternatively, the light reflection layer 160 is provided both on the upper side of the upper film 130 located at the uppermost side of the cell packing sheets 10 of the second embodiment and on the lower side of the lower film 120 located at the lowermost side of the cell packing sheets 10 of the second embodiment. The light reflection layer is provided by various methods such as adhering, welding, or the like.

The light reflection layer 160 is provided for reflecting light radiated on the packing sheet, thus minimizing generation of heat at a high temperature on the surface of the light reflection layer 160 of the cell packing sheet 10 and may be made of various materials such as an aluminum foil.

Alternatively, in order to further improve insulation efficiency of the cell packing sheet 10, instead of the light reflection layer 160, a cover layer 170 composed of any one of a paper layer, a non-woven layer, and a woven layer is provided by various methods such as adhering, welding, or the like.

INDUSTRIAL APPLICABILITY

The present invention can greatly reduce logistics costs by minimizing a volume during storage and transportation, while greatly increasing insulation.

The invention claimed is:

1. A method for producing a packing sheet with improved insulation and storage properties, the method comprising:
    producing a cell packing sheet by attaching together two vertically overlapping films such that multiple cells are formed therebetween; disposing a check valve in an injection hole formed in a first end of each of the multiple cells;
    sealing first ends and second ends of the multiple cells;
    inflating the multiple cells by injecting a fluid through the respective check valves of the multiple cells of the cell packing sheet;
    attaching an upper film and a lower film respectively to an upper side and a lower side of the cell packing sheet in which the multiple cells have been inflated, such that a space between each of the multiple cells is formed;
    cutting the cell packing sheet along a second edge thereof, the second edge including the second ends of the multiple cells, together with the upper and lower films such that the second ends of the sealed multiple cells of the cell packing sheet are opened;
    allowing the cell packing sheet from which the second edge is cut to pass between a pair of rotary rollers so as to remove the fluid in the multiple cells of the cell packing sheet while compressing the cell packing sheet;
    sealing a second end of the cut cell packing sheet, and second ends of the upper film and the lower film; and
    winding on an outer surface of a winding roller the cut cell packing sheet in which the second end thereof is sealed.

2. The method of claim 1, wherein a first end of the upper film and a first end of the lower film are extended longer than a first end of the cell packing sheet in a first side direction, and
    a common check valve is provided on an upper surface of the first end of the lower film.

3. The method of claim 2, wherein the common check valve comprises multiple common check valves that are provided at a regular interval on the upper surface of the first end of the lower film.

4. The method of claim 2, further comprising:
    forming a common injection space that is in communication with the check valves by sealing the first end of the lower film and the first end of the upper film, except for an injection hole of the common check valve.

5. The method of claim 2, wherein lower films, upper films, and cell packing sheets are attached together in a state in which the lower films and the upper films are alternately stacked on top of each other with the cell packing sheets each interposed between the lower films and the upper films, and
    the common check valve is provided on the upper surface of the first end of each of the lower films and on an upper surface of the first end of each of the upper films.

6. The method of claim 1, wherein the fluid is gas.

7. The method of claim 6, wherein the gas is air or an inert gas.

8. The method of claim 1, wherein the fluid is a liquid.

9. The method of claim 8, wherein the liquid is water.

10. The method of claim 1, wherein a light reflection layer is provided on an upper side of the upper film or on a lower side of the lower film, or the light reflection layer is provided both on the upper side of the upper film and on the lower side of the lower film.

11. The method of claim 1, wherein a cover layer is provided on an upper side of the upper film or on a lower side of the lower film, or the cover layer is provided both on the upper side of the upper film and on the lower side of the lower film.

* * * * *